(12) United States Patent
Noel

(10) Patent No.: US 11,710,318 B2
(45) Date of Patent: *Jul. 25, 2023

(54) SYSTEMS AND METHODS FOR CREATING VIDEO SUMMARIES

(71) Applicant: GoPro, Inc., San Mateo, CA (US)

(72) Inventor: Jean-Baptiste Noel, Le Vesinet (FR)

(73) Assignee: GoPro, Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/845,866

(22) Filed: Jun. 21, 2022

(65) Prior Publication Data

US 2022/0319175 A1 Oct. 6, 2022

Related U.S. Application Data

(63) Continuation of application No. 17/003,136, filed on Aug. 26, 2020, now Pat. No. 11,398,093, which is a continuation of application No. 16/710,883, filed on Dec. 11, 2019, now Pat. No. 10,783,378, which is a continuation of application No. 16/103,007, filed on Aug. 14, 2018, now Pat. No. 10,509,966.

(60) Provisional application No. 62/546,127, filed on Aug. 16, 2017.

(51) Int. Cl.
*G06V 20/40* (2022.01)
*G11B 27/031* (2006.01)

(52) U.S. Cl.
CPC .............. *G06V 20/47* (2022.01); *G06V 20/41* (2022.01); *G11B 27/031* (2013.01)

(58) Field of Classification Search
CPC ...................... G06K 9/00718; G06K 9/00751
See application file for complete search history.

(56) References Cited

U.S. PATENT DOCUMENTS

| | | | |
|---|---|---|---|
| 10,509,966 B1 * | 12/2019 | Noel | ...................... G06V 20/41 |
| 10,783,378 B2 * | 9/2020 | Noel | ...................... G06V 20/41 |
| 11,398,093 B1 * | 7/2022 | Noel | .................... G11B 27/031 |
| 2003/0061610 A1 | 3/2003 | Errico | |
| 2003/0160944 A1 | 8/2003 | Foote | |
| 2013/0108241 A1 | 5/2013 | Miyamoto | |

* cited by examiner

*Primary Examiner* — Girumsew Wendmagegn
(74) *Attorney, Agent, or Firm* — Esplin & Associates, PC

(57) ABSTRACT

Video information defining video content may be accessed. Highlight moments within the video content may be identified. Flexible video segments may be determined based on the highlight moments. Individual flexible video segments may include one or more of the highlight moments and a flexible portion of the video content. The flexible portion of the video content may be characterized by a minimum segment duration, a target segment duration, and a maximum segment duration. A duration allocated to the video content may be determined. One or more of the flexible video segments may be selected based on the duration and one or more of the minimum segment duration, the target segment duration, and/or the maximum segment duration of the selected flexible video segments. A video summary including the selected flexible video segments may be generated.

20 Claims, 8 Drawing Sheets

SYSTEMS AND METHODS FOR CREATING VIDEO SUMMARIES

FIELD

This disclosure relates to creating video summaries using flexible video segments.

BACKGROUND

Manually editing videos to include the desired portions of the videos in video summaries may be time consuming and difficult. Automatic solutions to create video summaries may not provide for flexibility in varying video portions included in the video summary or for continuity in the video summary when varying video portions included in the video summary.

SUMMARY

This disclosure relates to creating video summaries. Video information defining video content may be accessed. The video content may have a progress length. Highlight moments within the video content may be identified. Individual highlight moments may correspond to a moment within the progress length. Flexible video segments may be determined based on the highlight moments. Individual flexible video segments may include one or more of the highlight moments and a flexible portion of the video content. The flexible portion of the video content may be characterized by a minimum segment duration, a target segment duration, and a maximum segment duration. A duration allocated to the video content may be determined. One or more of the flexible video segments may be selected based on the duration and one or more of the minimum segment duration, the target segment duration, and/or the maximum segment duration of the selected flexible video segments. A video summary including the selected flexible video segments may be generated.

A system that creates video summaries may include one or more processors, and/or other components. The processor(s) may be configured by machine-readable instructions. Executing the machine-readable instructions may cause the processor(s) to facilitate creating video summaries. The machine-readable instructions may include one or more computer program components. The computer program components may include one or more of a video information component, a highlight moment component, a video segment component, a duration component, a selection component, a video summary component, and/or other computer program components.

The video information component may be configured to access video information and/or other information. Accessing the video information may include one or more of acquiring, analyzing, determining, examining, locating, obtaining, receiving, retrieving, reviewing, storing, and/or otherwise accessing the video information. The video information may define video content and/or other information. The video content may have a progress length. The video information component may access video information from one or more locations. The video information component may be configured to access video information defining video content during capture of the video content and/or after capture of the video content by one or more image sensors.

The highlight moment component may be configured to identify one or more highlight moments within the video content. Individual highlight moments may correspond to one or more moment within the progress length. A moment may include a single video frame, multiple video frames, a single point in time, and/or a duration of time. In some implementations, the highlight moments may include one or more manual highlight moments, one or more automatic highlight moments, and/or other highlight moments. Locations of the manual highlight moments in the progress length may be static. Locations of the automatic highlight moments in the progress length may be variable.

In some implementations, the highlight moment component may be configured to identify a first set of highlight moments. The first set of highlight moments may correspond a first set of flexible video segments. The first set of flexible video segments may be characterized by a total maximum segment duration. In some implementations, the total maximum segment duration may be shorter than the duration allocated to the video content. The highlight moment component may, responsive to the total maximum segment duration being shorter than the duration allocated to the video content, identify a second set of highlight moments.

The video segment component may be configured to determine flexible video segments. The flexible video segments may be determined based on the highlight moments and/or other information. Individual flexible video segments may include one or more of the highlight moments and a flexible portion of the video content. A flexible portion of the video content may be characterized by a minimum segment duration, a target segment duration, a maximum segment duration, and/or other durations. In some implementations, the flexible portion of the video content included in the flexible video segment may be determined based on an interest curve.

In some implementations, the minimum segment duration may be determined based on a minimum duration parameter and/or other information. The target segment duration may be determined based on a target duration parameter and/or other information. The maximum segment duration may be determined based on a maximum duration parameter and/or other information.

The duration component may be configured to determine a duration allocated to the video content. In some implementations, the duration allocated to the video content may include a minimum content duration, a maximum content duration, a target content duration, and/or other durations. In some implementations, a musical track may provide an accompaniment for the video summary, and the duration may be determined based on the musical track and/or other information. In some implementations, the duration may be determined further based on syncing of the musical track to the video content.

The selection component may be configured to select one or more of the flexible video segments. The flexible video segment(s) may be selected based on the duration, one or more of the minimum segment duration, the target segment duration, and/or the maximum segment duration of the selected flexible video segments, and/or other information.

The video summary component may be configured to generate a video summary. The video summary may include the selected flexible video segments and/or other information. Generating the video summary may include encoding one or more video files including the selected flexible segments and/or generating one or more files identifying the selected flexible segments.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
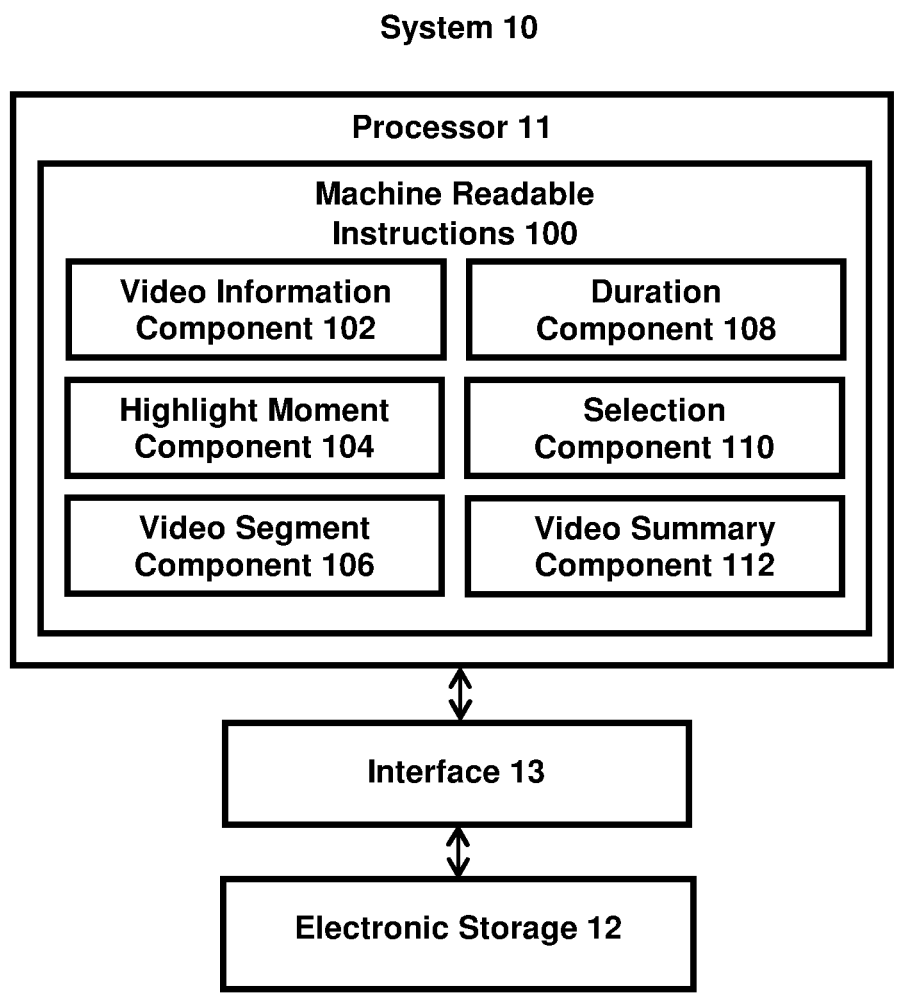
FIG. 1 illustrates a system that creates video summaries.

FIG. 1 illustrates a system 10 for creating video summaries. The system 10 may include one or more of a processor 11, an electronic storage 12, an interface 13 (e.g., bus, wireless interface), and/or other components. Video information defining video content may be accessed by the processor 11. The video content may have a progress length. Highlight moments within the video content may be identified. Individual highlight moments may correspond to a moment within the progress length. Flexible video segments may be determined based on the highlight moments. Individual flexible video segments may include one or more of the highlight moments and a flexible portion of the video content. The flexible portion of the video content may be characterized by a minimum segment duration, a target segment duration, and a maximum segment duration. A duration allocated to the video content may be determined. One or more of the flexible video segments may be selected based on the duration and one or more of the minimum segment duration, the target segment duration, and/or the maximum segment duration of the selected flexible video segments. A video summary including the selected flexible video segments may be generated.

The electronic storage 12 may be configured to include electronic storage medium that electronically stores information. The electronic storage 12 may store software algorithms, information determined by the processor 11, information received remotely, and/or other information that enables the system 10 to function properly. For example, the electronic storage 12 may store information relating to video information, video content, highlight moments, flexible video segments, minimum segment duration, target segment duration, maximum segment duration, duration allocated to video content, video summary, and/or other information.

Referring to FIG. 1, the processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine readable instructions 100 to facilitate creating video summaries. The machine readable instructions 100 may include one or more computer program components. The machine readable instructions 100 may include one or more of a video information component 102, a highlight moment component 104, a video segment component 106, a duration component 108, a selection component 110, a video summary component 112, and/or other computer program components The video information component 102 may be configured to access video information and/or other information. Accessing the video information may include one or more of acquiring, analyzing, determining, examining, locating, obtaining, receiving, retrieving, reviewing, storing, and/or otherwise accessing the video information. The video information may define video content and/or other information.

The video information component 102 may access video information from one or more locations. For example, the video information component 102 may access the video information from a storage location, such as the electronic storage 12, electronic storage of information and/or signals generated by one or more image sensors (not shown in FIG. 1), electronic storage of a device accessible via a network, and/or other locations. The video information component 102 may access the video information from a hardware component (e.g., an image sensor) and/or a software component (e.g., software running on a computing device).

The video information component 102 may be configured to access video information defining video content during capture of the video content and/or after capture of the video content by one or more image sensors. For example, the video information component 102 may access video information defining video content while the video content is being captured by one or more image sensors. The video information component 102 may access video information defining video content after the video content has been captured and stored in memory (e.g., the electronic storage 12, buffer memory).

Video content may have a progress length. A progress length may be defined in terms of time durations (e.g., capture time, view time) and/or frame numbers (e.g., number of captured frames). For example, video content may include a video having a time duration of 60 seconds. Video content may include a video having 1800 video frames. Video content having 1800 video frames may have a time duration of 60 seconds when captured/viewed at 30 frames/second. Other time durations and frame numbers are contemplated.

Video content may include one or more highlight moments. A highlight moment may indicate an occurrence/capture of one or more events of interest within the video content. Individual highlight moments may correspond to one or more moments within the progress length of the video content. A moment may include a single video frame, multiple video frames, a single point in time, and/or a duration of time. In some implementations, a highlight moment may include/be associated with a particular viewing angle. For example, a highlight moment for spherical video content may include/be associated with a given direction of view and/or a given zoom to view the spherical video content. In some implementations, the highlight moments may include one or more manual highlight moments, one or more automatic highlight moments, and/or other highlight moments. Manual highlight moments may be prioritized for inclusion in a video summary over automatic highlight moments. Manual highlight moments and/or automatic highlight moments may be ranked for inclusion in a video summary.

A manual highlight moment may include a highlight moment marked by a user. A manual highlight moment may be marked based on user input (e.g., button (physical and/or software) interaction, voice command, motions/gestures). A manual highlight moment may be marked during capture of the video content and/or after the capture of the video content (e.g., during playback).

Locations of manual highlight moments in the progress length may be static. Locations of manual highlight moments in the progress length may be determined based on user input and may not be changed based on locations of other highlight moments. For example, a location of a manual highlight moment may not change based on addition of highlight moment(s), removal of highlight moment(s), or changes in where existing highlight moments are located within the progress length of the video content.

An automatic highlight moment may include a highlight moment marked automatically by a computing system (e.g., image capture device, mobile device, desktop device). An automatic highlight moment may be marked based on information about the video content. For example, an automatic highlight moment may be marked based on context, activity, user intent, and/or other information. An automatic highlight moment may be marked based on sensor information characterizing the capture of the video content and/or activity captured within the video content (e.g., telemetry, IMU, GPS), audio analysis (e.g., speech, noise, music detection), visual analysis (e.g., faces, image quality, saliency), and/or other information. An automatic highlight moment may be marked based on one or more interest metrics indicating whether portions of the video content include capture of content that are of interest to one or more users (e.g., interest curve).

Locations of automatic highlight moments in the progress length may be variable. Locations of automatic highlight moments in the progress length may be determined based on locations of other highlight moments and may be changed based on changes in locations of other highlight moments. For example, a location of an automatic highlight moment may change based on addition of highlight moment(s), removal of highlight moment(s), or changes in where existing highlight moments are located within the progress length of the video content. A location of an automatic highlight moment may change by (1) moving to a different moment within the progress of the video content, (2) being removed from the video content, or (3) being added to the video content.

Figure 3A:
FIGS. 3A-3B illustrate example highlight moments within video content.
Figure 3B:
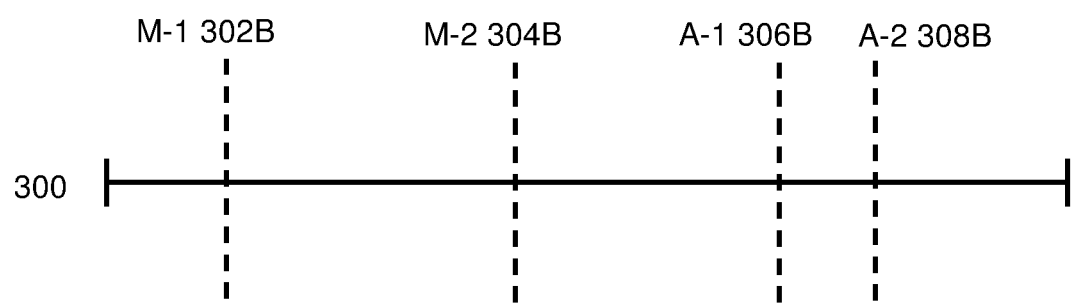

FIGS. 3A-3B illustrate example highlight moments within video content 300. In FIG. 3A, the video content may include manual highlight moments M-1 302A, M-2 304A, automatic highlight moments A-1 306A, A-2 308A, and/or other highlight moments. In FIG. 3B, the video content may include manual highlight moments M-1 302B, M-2 304B, automatic highlight moments A-1 306B, A-2 308B, and/or other highlight moments. A user may change the location of the manual highlight moment M-2 304A to the location of the manual highlight moment M-2 304B shown in FIG. 3B. The change in location of the manual highlight moment M-2 304A to the location of the manual highlight moment M-2 304B may change the location of the automatic highlight moment A-1 306A to the location of the automatic highlight moment A-1 306B. Moving the manual highlight moment M-2 304B closer to the automatic highlight moments A-1 306B, A-2 308B may move both the automatic highlight moments A-1 306B, A-2 308B. The change in location of the manual highlight moment M-2 304A to the location of the manual highlight moment M-2 304B may not change the location of the manual highlight moment M-1 302A. Other locations of highlight moments and changes in locations of highlight moments are contemplated.

Use of manual and automatic highlight moments may provide for continuity in creating video summaries. Small changes in locations of manual highlight moments may lead to small changes in locations of automatic highlight moments. Large changes in locations of manual highlight moments may lead to large changes in locations of automatic highlight moments. For example, small changes in locations of highlight moments may result in changes in a video summary that provides a similar experience with the original video summary, rather than creating a video summary that provides an entirely different experience.

The highlight moment component 104 may be configured to identify one or more highlight moments within the video content. The highlight moment component 104 may identify highlight moments based on manual marking, automatic marking, and/or other information. The highlight component 104 may identify highlight moments based on user input (received during and/or post capture of video content), information about the video content (e.g., sensor information, audio analysis, visual analysis, interest metric, interest curve), and/or other information. For example, referring to FIG. 3A, the highlight moment component 104 may identify the manual highlight moments M-1 302A, M-2 304A, the automatic highlight moments A-1 306A, A-2 308A, and/or other highlight moments in the video content 300. Referring to FIG. 3B, the highlight moment component 104 may identify the manual highlight moments M-1 302B, M-2 304B, automatic highlight moments A-1 306B, A-2 308B, and/or other highlight moments within the video content 300.

In some implementations, the highlight moment component 104 may be configured to identify one or more different sets of highlight moments. A set of highlight moments may include one or more highlight moments. For example, referring to FIG. 3A, the highlight moment component 104 may identify as a first set of highlight moments the manual highlight moments M-1 302A, M-2 304A, and the automatic highlight moment A-1 306A. The first set of highlight moments may correspond a first set of flexible video segments, such as described herein with respect to the video segment component 106. The first set of flexible video segments may be characterized by a total maximum segment duration.

In some implementations, the total maximum segment duration of the first set of flexible video segments may be shorter than a duration allocated to the video content (e.g., a duration that may be filled with video portion(s) from the video content, such as described herein with respect to the duration component 108). The highlight moment component 104 may, responsive to the total maximum segment duration being shorter than the duration allocated to the video content, identify a second set of highlight moments. For example, referring to FIG. 3A, the highlight moment component 104 may identify the automatic highlight moment A-2 306A and/or other highlight moments as the second set of highlight moments. One or more flexible video segments corresponding to the second set of flexible video segments may be used (e.g., in addition to the first set of flexible video segments) to fill the duration allocated to the video content. Identifying additional sets of highlight moments may allow the system 10 to increase the portions of the video content available for video summary generation.

The video segment component 106 may be configured to determine flexible video segments. A flexible video segment may refer to a video segment associated with a flexible portion of the video content. Rather than being defined by static start and end points, a flexible video segment may have variable start and end points. The video segment component 106 may determine flexible video segments based on the highlight moments and/or other information. For example, for one or more of the highlight moments identified by the highlight moment component 104, the video segment component 106 may identify flexible portions of the video content as flexible video segments corresponding to the highlight moment(s). Individual flexible video segments may include one or more of the highlight moments and the flexible portion of the video content. The flexible portion of the video content may be characterized by a minimum segment duration, a target segment duration, a maximum segment duration, and/or other durations.

Figure 4A:
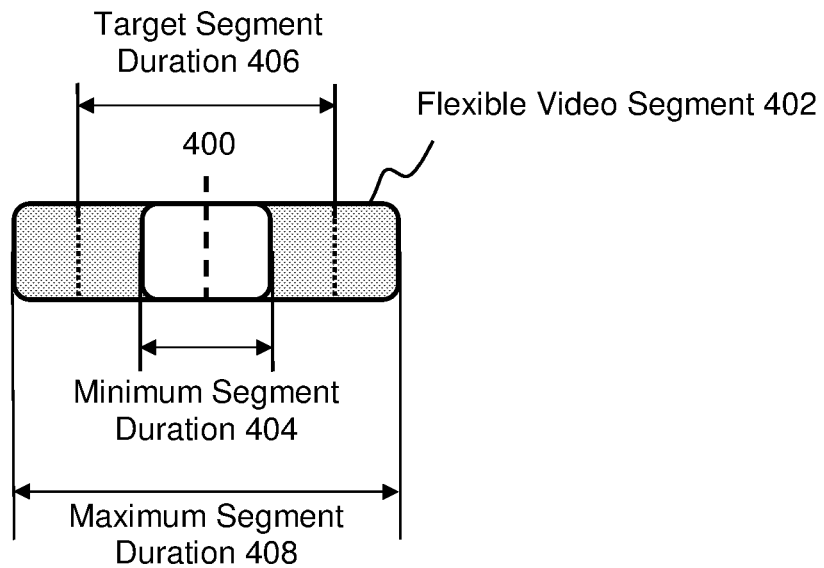
FIGS. 4A and 4B illustrate example flexible video segments.
Figure 4B:
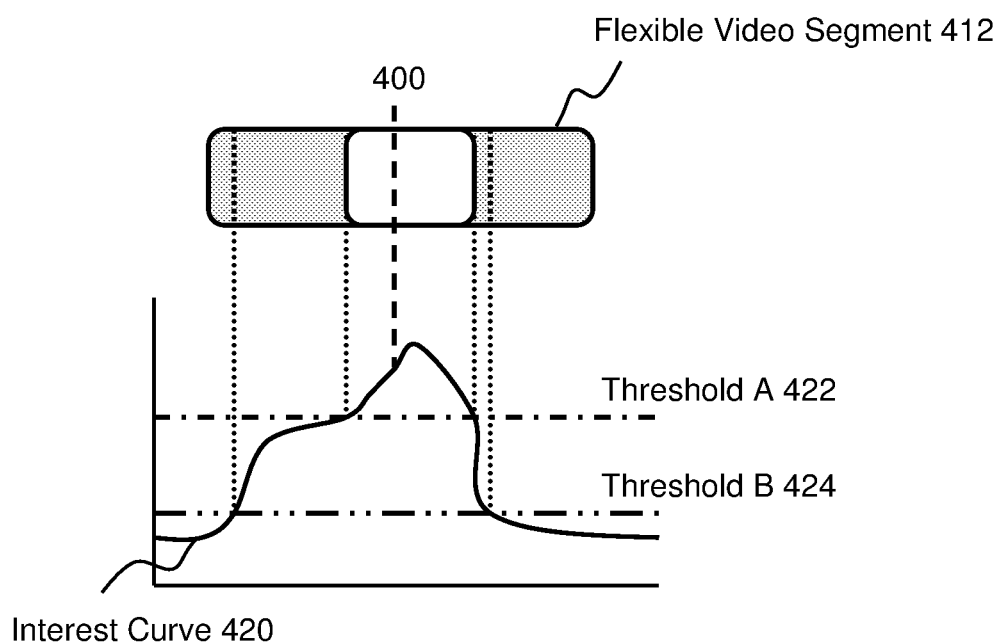

FIGS. 4A and 4B illustrate example flexible video segments 402, 412, respectively. The flexible video segment 402 may include a highlight 400 and/or other highlight moments. The flexible video segment 402 may be determined based on the highlight 400. The flexible video segment 402 may be characterized by a minimum segment duration 404, a target segment duration 406, a maximum segment duration 408, and/or other durations. The minimum segment duration 404 may correspond to the smallest portion of the video content to be included within a video summary if the flexible video segment 402 is included in the video summary. The target segment duration 406 may correspond to the target/desired portion of the video content to be included within a video summary if the flexible video segment 402 is included in the video summary. The maximum segment duration 408 may correspond to the largest portion of the video content to be included within a video summary if the flexible video segment 402 is included in the video summary. Including the flexible video segment 402 in a video summary may result in including a portion in between the minimum segment duration 404 and the maximum segment duration 408 of the video content corresponding to the flexible video segment, with the goal of including the portion corresponding to the target segment duration 406 (or close to the target segment duration 406).

The flexible video segment 402 may be centered about the highlight moment 400. The minimum segment duration 404, the target segment duration 406, and the maximum segment duration 408 of the flexible video segment 402 may include the same amounts of duration/video content before and after the highlight moment 400.

The flexible video segment 412 may include the highlight 400 and/or other highlight moments. The flexible video segment 412 may be determined based on the highlight 400. The flexible video segment 412 may be characterized by a minimum segment duration, a target segment duration, a maximum segment duration, and/or other durations. The flexible video segment 412 may not be centered about the highlight moment 400. The minimum segment duration, the target segment duration, and/or the maximum segment duration of the flexible video segment 412 may not include the same amounts of duration/video content before and after the highlight moment 400.

In some implementations, a flexible portion of the video content included in a flexible video segment may be determined based on an interest curve. For example, referring to FIG. 4B, the flexible portion of the video content included in the flexible video segment 412 may be determined based on the interest curve 420. The interest curve 420 may indicate the extent to which different portions of the video content include capture that are of interest to one or more users. Determining the flexible portion of the video content based on the interest curve may enable the system 10 to identify portions of the video content in a more flexible manner than using set parameters. Rather than identifying portions of the video content based on set times/frames (e.g., identifying a certain amount of video content before and/or after the highlight moment), the portions to be included within a flexible video segment may be determined based on one or more measures of interest of the video content. For example, as shown in FIG. 4B, a portion of the video content corresponding to the minimum segment duration may be identified based on the portion meeting a threshold A 422. A portion of the video content corresponding to the target segment duration may be identified based on the portion meeting a threshold B 424. A portion of the video content corresponding to the maximum segment duration may be identified based on the portion meeting another threshold (not shown in FIG. 4B). The desired portions of the video content may be identified by increasing/decreasing the thresholds.

In some implementations, one or more of the minimum segment duration, the target segment duration, and the maximum segment duration may be determined based on one or more parameters and/or other information. For example, the minimum segment duration may be determined based on a minimum duration parameter and/or other information. The minimum duration parameter may determine/specify the size/length of the minimum segment duration (e.g., minimum duration 404). The target segment duration may be determined based on a target duration parameter and/or other information. The target duration parameter may determine/specify the size/length of the target segment duration (e.g., target duration 406). The maximum segment duration may be determined based on a maximum duration parameter and/or other information. The maximum duration parameter may determine/specify the size/length of the maximum segment duration (e.g., maximum duration 408). One or more parameters for determining segment durations may be set based on user input, system default, video content (e.g., based on face/object/activity/emotion identification), and/or other information.

In some implementations, a flexible video segment may be determined further based on user edit and/or other information. For example, a user may manually adjust one or more of the minimum duration, the target duration, the maximum duration, and/or other durations. A user may specify one or more exclusion zones within the video content (e.g., mark one or more portions of video content as being rejected), and the flexible video segments may not include portions of the video content within the exclusion zone(s).

In some implementations, one or more flexible video segments may be joined together based on proximity of the video segments. For example, a user may set one or more parameters determining/specifying the minimum distance between two flexible video segment (to avoid the feel of the video summary having a leggy effect as if the video summary has skipped some frames). Based on the flexible video segments being near each other (e.g., meeting a minimum jump threshold), the flexible video segments may be joined.

Figure 5A:
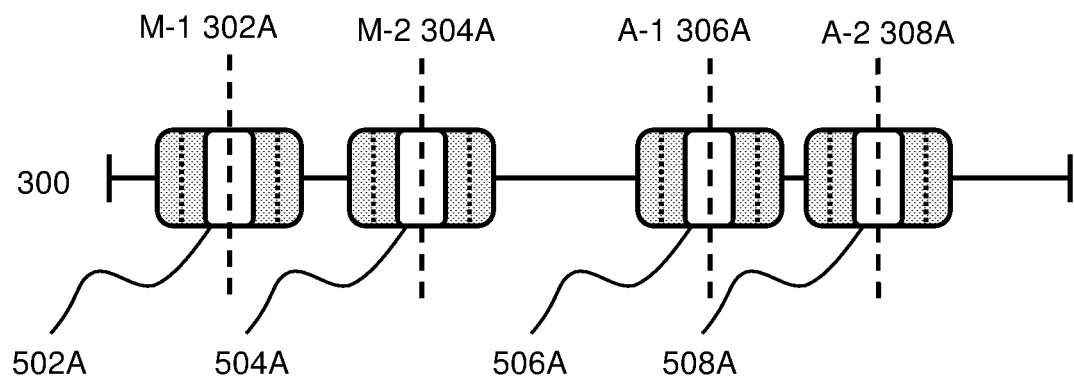
FIGS. 5A and 5B illustrate example flexible video segments identified for video content.
Figure 5B:
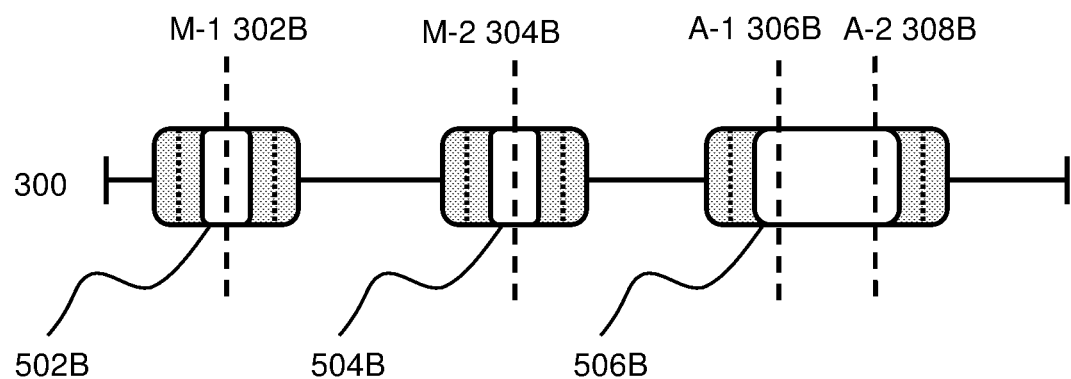

FIGS. 5A and 5B illustrate example flexible video segments determined for the video content 300. Referring to FIG. 5A, the video segment component 106 may determine flexible video segments 502A, 504A, 506A, 508A and/or other flexible video segments based on the highlight moments M-1 302A, M-2 304A, A-1 306A, A-2 308A (shown in FIG. 3A) and/or other information. Referring to FIG. 5B, the video segment component 106 may determine flexible video segments 502B, 504B, 506B, and/or other flexible video segments based on the highlight moments M-1 302B, M-2 304B, A-1 306B, A-2 308B (shown in FIG. 3B) and/or other information. Based on the proximity of the highlight moments A-1 306B, A-2 308B (based on the proximity of the flexible video segments determined based on the highlight moments A-1 306B, A-2 308B), the video segment component 106 may determine the flexible video segment 506B, which includes the highlight moments A-1 306B, A-2 308B.

The duration component 108 may be configured to determine a duration allocated to the video content. The duration allocated to the video content may include a duration that may be filled with video portion(s) (e.g., based on the flexible video segments) from the video content. The duration allocated to the video content may be determined based on user input, video content, syncing with musical track(s), and/or other information. For example, the duration allocated to the video content may be set by a user, determined based on video content (e.g., based on identification of face, object, activity, emotion and/or other information within the video content; based on length of the video content), length of the musical track(s) to which a video summary will be synchronized, positions of musical events within musical tracks, and/or other information. In some implementations, the duration allocated to the video content may include a minimum content duration, a maximum content duration, a target content duration, and/or other durations, providing for a flexible duration allocated to the video content. Determining a flexible duration of video content for a video summary may result in including portion(s) of the video content to fill up in between the minimum content duration and the maximum content duration, with the goal of including portion(s) of the video content to fill up the target content duration.

In some implementations, one or more of the minimum content duration, the maximum content duration, the target content duration may be determined based on a length of the video content. The length of the video content may refer to the time length of the entire video content and/or the portion of the video content selected by a user. In some implementations, the different content durations may be determined based on one or more parameters, such as discussed above with respect to flexible video segments.

In some implementations, the different content durations may be determined based on one or more polar functions and/or other information. For example, the target content duration may be calculated as a minimum of [1] 1*(video content length)^0.65, and [2] video content length. The minimum content duration may be calculated as minimum of [1] 0.2*(target content duration), and [2] 0.75*(video content length). The maximum content duration may be calculated as minimum of [1] 2*(target content duration), and [2] video content length. For example, for video content having a length of thirty seconds (e.g., entire length of the video content, selected portion of the video content), the minimum content duration may be 1.84 seconds, the target content duration may be 9.12 seconds, and the maximum content duration may be 18.24 seconds. Other determinations of minimum, target, and maximum content durations are contemplated.

In some implementations, one or more musical tracks may provide an accompaniment for the video summary, and the duration may be determined based on the musical track(s) and/or other information. For example, based on the video summary being accompanied by a musical track of a certain length (e.g., thirty seconds), the duration may be set so that the video summary covers the length of the musical track (e.g., thirty seconds). In some implementations, the duration may be determined further based on syncing of the musical track to the video content. For example, multiple video summaries may be used to provide visuals during playback of a musical track, and the duration of the individual video summaries may be determined based on the syncing of the video summaries with the musical track (e.g., syncing transitions between the video summaries to particular musical event/onset).

The selection component 110 may be configured to select one or more of the flexible video segments. The flexible video segments may be selected for inclusion in a video summary. The flexible video segment(s) may be selected based on the duration allocated to the video content, one or more of the minimum segment duration, the target segment duration, and/or the maximum segment duration of the selected flexible video segments, and/or other information.

Figure 6A:
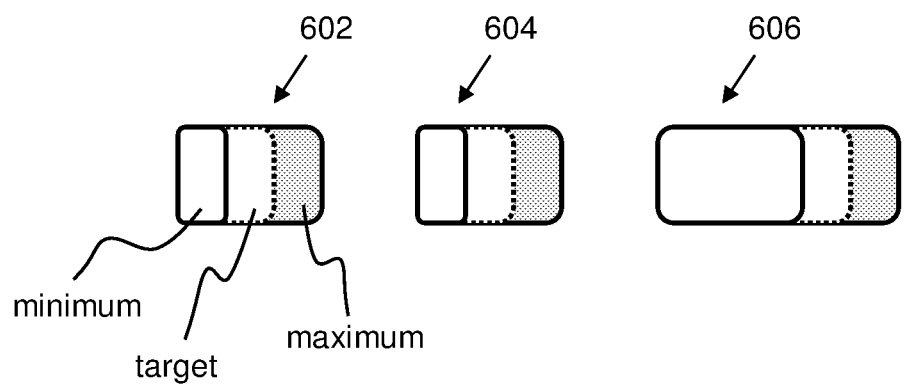
FIG. 6A illustrates example minimum segment durations, target segment durations, and maximum segment durations for flexible video segments.

For example, FIG. 6A illustrates example minimum segment durations, target segment durations, and maximum segment durations for the flexible video segments 502B, 504B, 506B (shown in FIG. 5B). A block 602 shows the minimum segment duration, target segment duration, and maximum segment duration for the flexible video segments 502B. A block 604 shows the minimum segment duration, target segment duration, and maximum segment duration for the flexible video segments 504B. A block 606 shows the minimum segment duration, target segment duration, and maximum segment duration for the flexible video segments 506B.

Figure 6B:
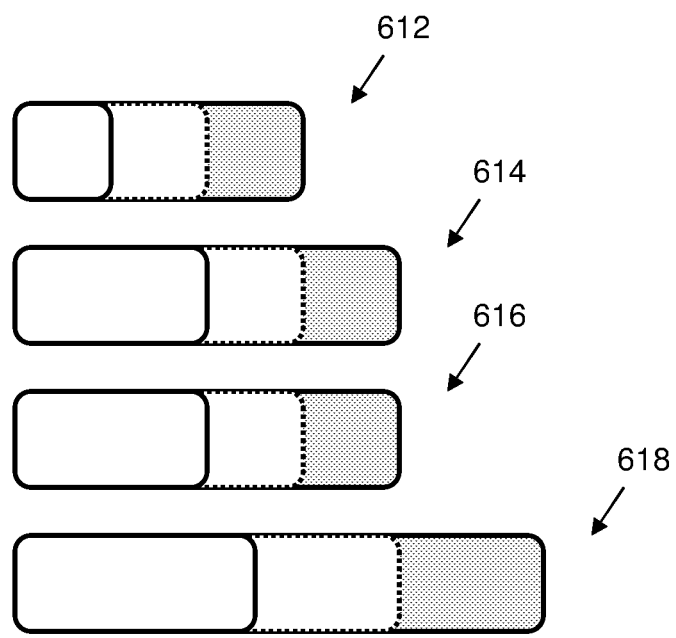
FIG. 6B illustrates example total minimum segment durations, total target segment durations, and total maximum segment durations for different combination of flexible video segments.

FIG. 6B illustrates example total minimum segment durations, total target segment durations, and total maximum segment durations for different combination of the flexible video segments 502B, 504B, 506B (shown in FIG. 5B). A block 612 shows total minimum segment duration, total target segment duration, and total maximum segment duration for a combination of the flexible video segments 502B, 504B. A block 614 shows total minimum segment duration, total target segment duration, and total maximum segment duration for a combination of the flexible video segments 502B, 506B. A block 616 shows total minimum segment duration, total target segment duration, and total maximum segment duration for a combination of the flexible video segments 504B, 506B. A block 618 shows total minimum segment duration, total target segment duration, and total maximum segment duration for a combination of the flexible video segments 502B, 504B, 506B.

Figure 6C:
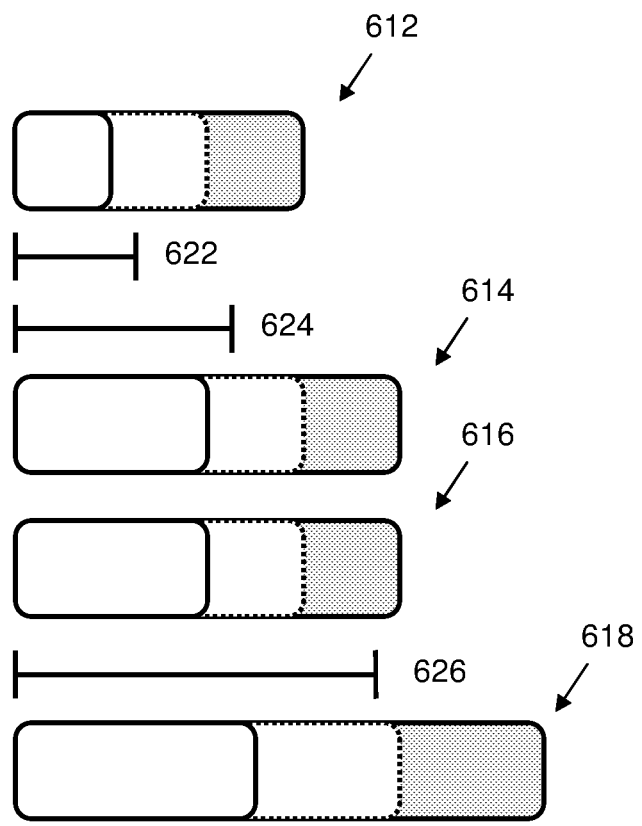
FIG. 6C illustrates example comparisons of segment durations to durations allocated to video content.

FIG. 6C illustrates example comparisons of total segment durations to durations allocated to video content. In FIG. 6C, the blocks 612, 614, 616, 618 may be compared with durations 622, 624, 626. Based on the duration allocated to video content being the duration 622, the selection component 110 may select flexible video segments 502B, 504B (corresponding to the block 612). Other blocks 614, 616, 618 may include total minimum segment durations that are longer than the duration 622.

Based on the duration allocated to video content being the duration 624, the selection component 110 may select flexible video segments 502B, 504B (corresponding to the block 612), flexible video segments 502B, 506B (corresponding to the block 614), or flexible video segments 504B, 506B (corresponding to the block 616). Block 618 may include total minimum segment duration longer than the duration 624. The selection component 110 may prioritize selection of flexible video segments 502B, 504B because the total target segment duration is closer to the duration 624 than the total target segment duration for selection of other video segments and/or because the selection of flexible video segments 502B, 504B leads to inclusion of two manual highlight moments (M-1 302B and M-2 304B) rather than one manual highlight moment (M-1 302B or M-2 304B).

Based on the duration allocated to video content being the duration 626, the selection component 110 may select flexible video segments 502B, 506B (corresponding to the block 614), flexible video segments 504B, 506B (corresponding to the block 616), or flexible video segments 502B, 504B, 506B (corresponding to the block 618). Block 612 may include total maximum segment duration shorter than the duration 626. The selection component 110 may prioritize selection of flexible video segments 502B, 504B, 506B because the total target segment duration is closer to the duration 626 than selection of other video segments. Other selections of flexible video segments are contemplated.

In some implementations, the duration allocated to video content may include minimum content duration, target content duration, maximum content duration, and/or other durations. The flexible video segments may be selected based on matching of different segment durations to different content duration. Selection of the flexible video segments may prioritize one selection (e.g., filling out target content duration) over another selection (e.g., use of target segment durations). Various combinations of segment durations and content durations are contemplated.

Figure 7A:
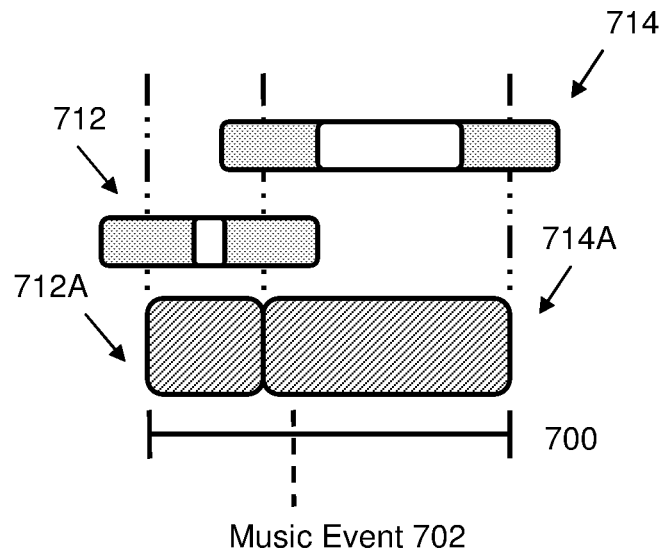
FIGS. 7A and 7B illustrate example comparisons of flexible video segments to a musical track.
Figure 7B:
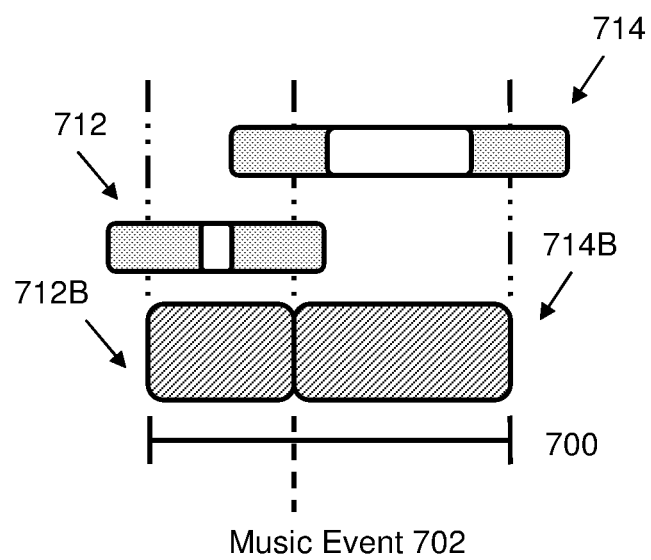

In some implementations, the use of flexible video segments may enable the system 10 to select different lengths of the flexible video segments based on syncing with one or more musical tracks. For example, FIGS. 7A and 7B illustrate example comparisons of flexible video segments 712, 714 to a musical track 700. In FIG. 7A, the portion of the flexible video segment 712 included in a video summary may be represented by a block 712A and the portion of the flexible video segment included in the video summary may be represented by a block 714A. The musical track 700 may include a music event 702. As shown in FIG. 7A, the music event 702 may occur during playback of the block 714A.

The flexibility of flexible video segments may be used to better synchronize one or more flexible video segments to the musical track 700. For example, as shown in FIG. 7B, the portion of the flexible video segment 712 included in the video summary may be increased (as represented by a block 712B) and the portion of the flexible video segment 714 included in the video summary may be decreased (as represented by a block 714B). Adjustments of the amount of flexible video segments 712, 714 included in the video summary may enable syncing of the flexible video segments 712, 714 to the musical track 700 such that the music event 702 occurs at the moment of transition from the flexible video segment 712 to the flexible video segment 714. While the synching of flexible video segments to the musical track is shown with respect to transition between the flexible video segments, other types of syncing are contemplated. For example, the flexibility of the flexible video segments may be used to sync highlight moments within the flexible video segments to music events.

The video summary component 112 may be configured to generate a video summary. A video summary may refer a collection of one or more portions of video content. The video summary may include the selected flexible video segments and/or other information. Generating the video summary may include encoding one or more video files including the selected flexible segments and/or generating one or more files identifying the selected flexible segments. For example, the video summary component 102 may encode a video file that includes the selected flexible segments. The video file may be accessed for playback of the video summary. The video summary component 102 may generate one or more files that identifies the selected flexible segments such that a computing device may access the files(s) to provide a view of the selected flexible segments.

In some implementations, video content may include one or more of spherical video content, virtual reality content, and/or other video content. Spherical video content and/or virtual reality content may define visual content viewable from one or more points of view as a function of progress through the spherical/virtual reality video content.

Spherical video content may refer to a video capture of multiple views from a single location. Spherical video content may include a full spherical video capture (360 degrees of capture) or a partial spherical video capture (less than 360 degrees of capture). Spherical video content may be captured through the use of one or more cameras/image sensors to capture images/videos from a location. The captured images/videos may be stitched together to form the spherical video content.

Virtual reality content may refer to content that may be consumed via virtual reality experience. Virtual reality content may associate different directions within the virtual reality content with different viewing directions, and a user may view a particular directions within the virtual reality content by looking in a particular direction. For example, a user may use a virtual reality headset to change the user's direction of view. The user's direction of view may correspond to a particular direction of view within the virtual reality content. For example, a forward looking direction of view for a user may correspond to a forward direction of view within the virtual reality content.

Spherical video content and/or virtual reality content may have been captured at one or more locations. For example, spherical video content and/or virtual reality content may have been captured from a stationary position (e.g., a seat in a stadium). Spherical video content and/or virtual reality content may have been captured from a moving position (e.g., a moving bike). Spherical video content and/or virtual reality content may include video capture from a path taken by the capturing device(s) in the moving position. For example, spherical video content and/or virtual reality content may include video capture from a person walking around in a music festival.

While the description herein may be directed to video content, one or more other implementations of the system/method described herein may be configured for other types media content. Other types of media content may include one or more of audio content (e.g., music, podcasts, audio books, and/or other audio content), multimedia presentations, images, slideshows, visual content (one or more images and/or videos), and/or other media content.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible computer readable storage medium may include read only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

Although processor 11 and electronic storage 12 are shown to be connected to interface 13 in FIG. 1, any communication medium may be used to facilitate interaction between any components of system 10. One or more components of system 10 may communicate with each other through hard-wired communication, wireless communication, or both. For example, one or more components of system 10 may communicate with each other through a network. For example, processor 11 may wirelessly communicate with electronic storage 12. By way of non-limiting example, wireless communication may include one or more of radio communication, Bluetooth communication, Wi-Fi communication, cellular communication, infrared communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be configured to execute one or more components by software; hardware; firmware; some combination of software, hardware, and/or firmware; and/or other mechanisms for configuring processing capabilities on the processor 11.

It should be appreciated that although computer components are illustrated in FIG. 1 as being co-located within a single processing unit, in implementations in which the processor 11 comprises multiple processing units, one or more of computer program components may be located remotely from the other computer program components.

While the computer program components are described herein as being implemented via processor 11 through machine readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented.

The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, the processor 11 may be configured to execute one or more additional computer program components that may perform some or all of the functionality attributed to one or more of computer program components described herein.

In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

The electronic storage media of the electronic storage 12 may be provided integrally (i.e., substantially non-removable) with one or more components of the system 10 and/or removable storage that is connectable to one or more components of the system 10 via, for example, a port (e.g., a USB port, a Firewire port, etc.) or a drive (e.g., a disk drive, etc.). The electronic storage 12 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 12 may be a separate component within the system 10, or the electronic storage 12 may be provided integrally with one or more other components of the system 10 (e.g., the processor 11). Although the electronic storage 12 is shown in FIG. 1 as a single entity, this is for illustrative purposes only. In some implementations, the electronic storage 12 may comprise a plurality of storage units. These storage units may be physically located within the same device, or the electronic storage 12 may represent storage functionality of a plurality of devices operating in coordination.

Figure 2:
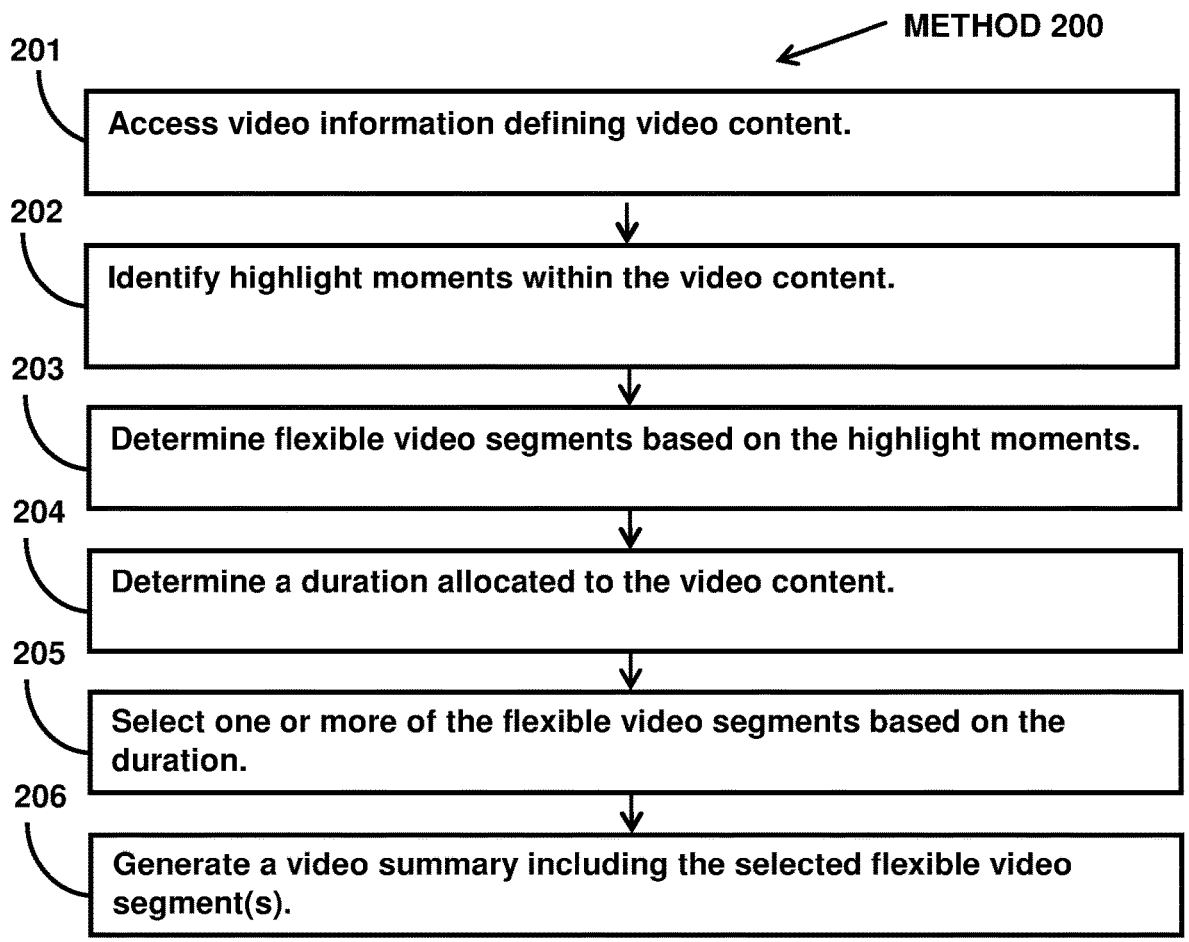
FIG. 2 illustrates a method for creating video summaries.

FIG. 2 illustrates method 200 for creating video summaries. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage mediums. The one or more processing devices may include one or more devices configured through hardware, firmware, and/or software to be specifically designed for execution of one or more of the operation of method 200.

Referring to FIG. 2 and method 200, at operation 201, video information defining video content may be accessed. The video content may have a progress length. In some implementation, operation 201 may be performed by a processor component the same as or similar to the video information component 102 (Shown in FIG. 1 and described herein).

At operation 202, highlight moments within the video content may be identified. Individual highlight moments may correspond to a moment within the progress length. In some implementations, operation 202 may be performed by a processor component the same as or similar to the highlight moment component 104 (Shown in FIG. 1 and described herein).

At operation 203, flexible video segments may be determined based on the highlight moments. Individual flexible video segments may include one or more highlight moments and a flexible portion of the video content. A flexible portion of the video content may be characterized by a minimum segment duration, a target segment duration, and a maximum segment duration. In some implementations, operation 203 may be performed by a processor component the same as or similar to the video segment component 106 (Shown in FIG. 1 and described herein).

At operation 204, a duration allocated to the video content may be determined. In some implementations, operation 204 may be performed by a processor component the same as or similar to the duration component 108 (Shown in FIG. 1 and described herein).

At operation 205, one or more of the flexible video segments may be selected based on the duration. The flexible video segments may be selected based on comparison of the duration with one or more of the minimum segment duration, the target segment duration, and/or the maximum segment duration of the selected flexible video segment(s). In some implementations, operation 205 may be performed by a processor component the same as or similar to the selection component 110 (Shown in FIG. 1 and described herein).

At operation 206, a video summary including the selected flexible video segment(s) may be generated. In some implementations, operation 206 may be performed by a processor component the same as or similar to the video summary component 112 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for creating video summaries, the system comprising:
   one or more physical processors configured by machine-readable instructions to:
   access video information defining video content, the video content having a progress length, the video content including highlight moments at different moments within the progress length;
   determine flexible video segments for generation of a video summary based on the highlight moments, an individual flexible video segment including one or more of the highlight moments and a flexible portion of the video content, the individual flexible video segment having a variable start point and/or a variable end point within the progress length to enable the individual flexible video segment to span different segment durations;
   select one or more of the flexible video segments based on a duration of the video summary to be generated from the video content and the different segment durations of the flexible video segments; and
   generate the video summary including the one or more selected flexible video segments.

2. The system of claim 1, wherein the flexible portion of the video content included in the individual flexible video segment is characterized by a minimum segment duration and a maximum segment duration, the variable start point and/or the variable end point of the individual flexible video segment enables the individual flexible video segment to span from the minimum segment duration to the maximum segment duration.

3. The system of claim 2, wherein the flexible portion of the video content included in the individual flexible video segment is further characterized by a target segment duration.

4. The system of claim 1, wherein a musical track provides an accompaniment for the video summary, and the duration of the video summary to be generated from the video content is determined based on a length of the musical track.

5. The system of claim 4, wherein a given segment duration of a given flexible video segment included in the video summary is determined based on syncing of the given flexible video segment to the musical track.

6. The system of claim 1, wherein a given flexible portion of the video content of a given flexible video segment included in the video summary is determined based on an interest curve for the video content.

7. The system of claim 1, wherein the highlight moments include one or more manual highlight moments and one or more automatic highlight moments.

8. The system of claim 7, wherein the selection of the one or more of the flexible video segments prioritizes inclusion of greater number of the one or more manual highlight moments than number of the one or more automatic highlight moments within the video summary.

9. The system of claim 1, wherein the one or more physical processors are further configured by the machine-readable instruction to:
   identify a first set of highlight moments, the first set of highlight moments corresponding to a first set of flexible video segments, the first set of flexible video segments characterized by a total maximum segment duration;
   determine that the total maximum segment duration is shorter than the duration of the video summary to be generated from the video content; and
   responsive to the determination that the total maximum segment duration is shorter than the duration of the video summary to be generated from the video content, identify a second set of highlight moments.

10. A method for creating video summaries, the method performed by a computing system including one or more physical processors, the method comprising:
   accessing, by the computing system, video information defining video content, the video content having a progress length, the video content including highlight moments at different moments within the progress length;
   determining, by the computing system, flexible video segments for generation of a video summary based on the highlight moments, an individual flexible video segment including one or more of the highlight moments and a flexible portion of the video content, the individual flexible video segment having a variable start point and/or a variable end point within the progress length to enable the individual flexible video segment to span different segment durations;

selecting, by the computing system, one or more of the flexible video segments based on a duration of the video summary to be generated from the video content and the different segment durations of the flexible video segments; and generating, by the computing system, the video summary including the one or more selected flexible video segments.

11. The method of claim 10, wherein the flexible portion of the video content included in the individual flexible video segment is characterized by a minimum segment duration and a maximum segment duration, the variable start point and/or the variable end point of the individual flexible video segment enables the individual flexible video segment to span from the minimum segment duration to the maximum segment duration.

12. The method of claim 11, wherein the flexible portion of the video content included in the individual flexible video segment is further characterized by a target segment duration.

13. The method of claim 10, wherein a musical track provides an accompaniment for the video summary, and the duration of the video summary to be generated from the video content is determined based on a length of the musical track.

14. The method of claim 13, wherein a given segment duration of a given flexible video segment included in the video summary is determined based on syncing of the given flexible video segment to the musical track.

15. The method of claim 10, wherein a given flexible portion of the video content of a given flexible video segment included in the video summary is determined based on an interest curve for the video content.

16. The method of claim 10, wherein the highlight moments include one or more manual highlight moments and one or more automatic highlight moments.

17. The method of claim 16, wherein selecting the one or more of the flexible video segments prioritizes inclusion of greater number of the one or more manual highlight moments than number of the one or more automatic highlight moments within the video summary.

18. The method of claim 10, further comprising:

identifying, by the computing system, a first set of highlight moments, the first set of highlight moments corresponding to a first set of flexible video segments, the first set of flexible video segments characterized by a total maximum segment duration;

determining, by the computing system, that the total maximum segment duration is shorter than the duration of the video summary to be generated from the video content; and responsive to determining that the total maximum segment duration is shorter than the duration of the video summary to be generated from the video content, identifying, by the computing system, a second set of highlight moments.

19. A system for creating video summaries, the system comprising:

one or more physical processors configured by machine-readable instructions to:

access video information defining video content, the video content having a progress length, the video content including highlight moments at different moments within the progress length;

determine flexible video segments for generation of a video summary based on the highlight moments, an individual flexible video segment including one or more of the highlight moments and a flexible portion of the video content, the individual flexible video segment having a variable start point and/or a variable end point within the progress length to enable the individual flexible video segment to span different segment durations;

select one or more of the flexible video segments based on a duration of the video summary to be generated from the video content and the different segment durations of the flexible video segments, the duration of the video summary to be generated from the video content determined based on a length of a musical track to provide accompaniment for the video summary, wherein a given segment duration of a given flexible video segment selected for inclusion in the video summary is determined based on syncing of the given flexible video segment to the musical track; and generate the video summary including the one or more selected flexible video segments.

20. The system of claim 19, wherein:

the flexible portion of the video content included in the individual flexible video segment is characterized by a minimum segment duration and a maximum segment duration;

the variable start point and/or the variable end point of the individual flexible video segment enables the individual flexible video segment to span from the minimum segment duration to the maximum segment duration; and a given flexible portion of the video content of the given flexible video segment selected for inclusion in the video summary is determined based on an interest curve for the video content.

* * * * *